UNITED STATES PATENT OFFICE.

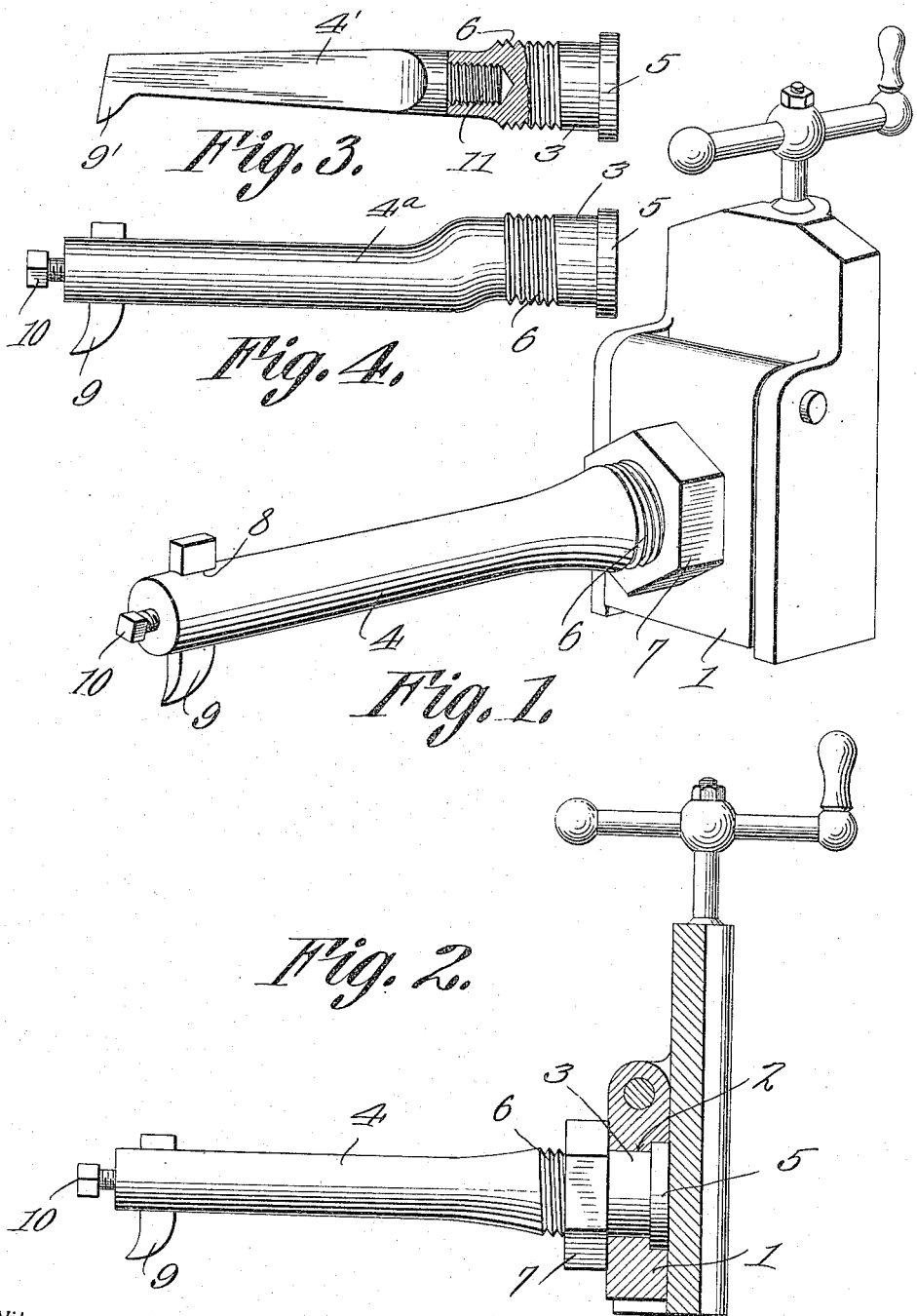

GUS HELINE, OF SUPERIOR, WISCONSIN.

TOOL-HOLDER.

1,177,185.  Specification of Letters Patent.  Patented Mar. 28, 1916.

Application filed December 4, 1914. Serial No. 875,509.

*To all whom it may concern:*

Be it known that I, GUS HELINE, a citizen of the United States, residing at Superior, in the county of Douglas and State of Wisconsin, have invented a new and useful Tool-Holder, of which the following is a specification.

The present invention relates to improvements in tool holders, and more especially to that type of tool holder adapted to be used in connection with clapper blocks, one object of the invention, being the provision of a holder which is adapted to be readily attached to the clapper block and is especially constructed for carrying a tool transversely through the end thereof and for adjustment at any desired angle in cutting tubular bores.

A further object of the present invention, is the provision of a simple, inexpensive and durable construction of tool holder, which is readily adjusted in use and connected to the clapper block.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a perspective view of a clapper block showing the present tool holder operably connected thereto. Fig. 2 is a longitudinal sectional view through the clapper block and the present tool holder. Figs. 3 and 4 are detail views of modified forms of tools and holders used with the present device.

Referring to the drawings, the numeral 1 designates the clapper block of usual construction, provided with the opening 2 for the reception of the cylindrical portion 3 of the tool holder 4. The tool holder 4 in the present instance is constructed in cylindrical shape, with the portion 3 larger than the outer end thereof, the same being further provided with the shoulder or head 5 which is adapted to abut the rear face of the clapper block 1, so that the threads 6 thereof will be projected beyond the outer face of the clapper block to receive the lock nut 7, by means of which the present tool is locked to the clapper block at any desired adjustment.

Formed in the outer end of the tool holder 4 is a transverse rectangular bore 8, for the reception of the tool 9, there being disposed concentrically at the outer end of the tool holder 4, a set screw 10, which is adapted to engage the tool 9 and thus lock the tool in the desired adjustment.

It will thus be seen that by means of the cylindrical portion 3, that the shank of the present tool may be disposed at any desired angle so as to present the cutting edge of the tool 9 where it will do the work in the most desirable manner.

By making the shank of the tool relatively long, it is apparent that the same may be disposed within the material operated upon and in view of the fact that the cylindrical portion 3 is of greater diameter than the shank, the present tool will be sufficiently reinforced to withstand any tension or strain thrown thereupon.

In the construction shown in Fig. 3, the tool 4' consists of two parts which are threaded together as shown at 11, the working part of the tool carrying an integral cutting bit 9'. The parts of the tool 4' are relatively movable for purposes of adjustment, and to permit a change in the working part of the tool.

In the construction shown in Fig. 4, the shank 4ª is slightly offset from that shown in Figs. 1 and 2, otherwise the tool is identical with that heretofore described.

What is claimed is:

The combination with a clapper block provided with a double diametered tool holder receiving opening therethrough, of a tool holder having a cylindrical end for fitting within the opening, an annular projection carried by the tool holder adjacent the cylindrical portion for fitting within the enlarged diametered portion of the opening, said tool holder being provided with exterior screw threads, and a nut engaging said screw threads and for disposition against the outer face of the clapper block for locking the tool holder in adjusted position.

In testimony that I claim the foregoing as my own, I have hereto affixed my signature in the presence of two witnesses.

GUS HELINE.

Witnesses:
A. A. CAMPBELL,
C. E. NELSON.

Copies of this patent may be obtained for five cents each, by addressing the "Commissioner of Patents, Washington, D. C."